US012348290B2

(12) United States Patent
Li et al.

(10) Patent No.: US 12,348,290 B2
(45) Date of Patent: *Jul. 1, 2025

(54) METHODS AND DEVICES FOR REPORTING AND PROCESSING CHANNEL STATE INFORMATION, AND STORAGE MEDIUM

(71) Applicant: ZTE CORPORATION, Guangdong (CN)

(72) Inventors: Yong Li, Guangdong (CN); Hao Wu, Guangdong (CN); Yu Ngok Li, Guangdong (CN); Zhaohua Lu, Guangdong (CN); Yijian Chen, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/660,393

(22) Filed: May 10, 2024

(65) Prior Publication Data

US 2024/0291540 A1  Aug. 29, 2024

Related U.S. Application Data

(63) Continuation of application No. 17/266,740, filed as application No. PCT/CN2019/100165 on Aug. 12, 2019, now Pat. No. 12,009,893.

(30) Foreign Application Priority Data

Aug. 10, 2018 (CN) .......................... 201810909262.8

(51) Int. Cl.
*H04L 27/28* (2006.01)
*H04B 7/06* (2006.01)
*H04L 5/00* (2006.01)

(52) U.S. Cl.
CPC ......... *H04B 7/0626* (2013.01); *H04B 7/0632* (2013.01); *H04B 7/0634* (2013.01); *H04L 5/0094* (2013.01)

(58) Field of Classification Search
CPC .. H04B 7/0456; H04B 7/0626; H04B 7/0632; H04B 7/0634; H04B 7/0641;
(Continued)

(56) References Cited

U.S. PATENT DOCUMENTS 10,840,981 B2 * 11/2020 Li .......................... H04W 72/12
11,296,767 B2 *  4/2022 Park ...................... H04B 7/063
(Continued)

FOREIGN PATENT DOCUMENTS

CN  101277166 A  10/2008
CN  101808370 A   8/2010
(Continued)

OTHER PUBLICATIONS

AT&T, "Remaining issues in CQI and MCS," 3GPP draft; R1-1802594, Remaining Issues in CQI and MCS Selection, 3GPP, Mobile Competence Centre. (2018) XP051398034, 7 pages.
(Continued)

*Primary Examiner* — Phuc H Tran
(74) *Attorney, Agent, or Firm* — McDonald Hopkins LLC

(57) ABSTRACT

Provided are a method and device for reporting channel state information (CSI), a method and device for processing channel state information, and a storage medium. The method for reporting channel state information includes: dividing M subbands to be reported into two sets; determining a relative value between CSI of each subband in a second set and CSI of a reference subband corresponding to the each subband in the second set; and reporting CSI of each subband in a first set and the relative value of the each subband in the second set to a base station.

17 Claims, 1 Drawing Sheet

(58) Field of Classification Search
CPC ... H04B 7/0658; H04B 7/066; H04L 25/0204; H04L 25/0228; H04L 5/0094
See application file for complete search history.

(56) References Cited

U.S. PATENT DOCUMENTS

| | | |
|---|---|---|
| 2009/0109909 A1 | 4/2009 | Onggosanusi et al. |
| 2009/0116570 A1 | 5/2009 | Bala et al. |
| 2010/0220675 A1* | 9/2010 | Chun ................... H04L 1/0025 |
| | | 370/328 |
| 2010/0254272 A1* | 10/2010 | Chun ................... H04L 1/0029 |
| | | 370/252 |
| 2010/0278058 A1 | 11/2010 | Damnjanovic et al. |

FOREIGN PATENT DOCUMENTS

| | | |
|---|---|---|
| CN | 102055547 A | 5/2011 |
| CN | 102428668 A | 4/2012 |
| CN | 103580779 A | 2/2014 |
| CN | 105991220 A | 10/2016 |
| CN | 107743042 A | 2/2018 |
| CN | 108282254 A | 7/2018 |
| WO | 2011097924 A1 | 8/2011 |
| WO | 2020156510 A1 | 8/2020 |

OTHER PUBLICATIONS

International Search Report in PCT/CN2019/100165, mailed Oct. 30, 2019, 4 pages.

* cited by examiner

METHODS AND DEVICES FOR REPORTING AND PROCESSING CHANNEL STATE INFORMATION, AND STORAGE MEDIUM

CROSS-REFERENCE TO RELATED APPLICATIONS

This is a continuation of US patent application Ser. No. 17/266,740 which is a U.S National Stage Application of International Patent Application No. PCT/CN2019/100165, filed on Aug. 12, 2019, which claims priority to Chinese Patent Application No. 201810909262.8 filed on Aug. 10, 2018, disclosures of which are incorporated herein by reference in their entireties.

TECHNICAL FIELD

The present disclosure relates to the field of wireless communication, for example, to a method and device for reporting channel state information, a method and device for processing channel state information, and a storage medium.

BACKGROUND

In wireless communication, the precoding technology among multi-antenna wireless communication technologies is to perform precoding on transmit antennas to improve communication performance. Generally, a transmitting side transmits one reference signal (RS) on one resource, and a receiving side measures channel state information (CSI) by using the reference signal and then feeds back the measured channel state in a precoding form. The precoding is generally fed back in a form of precoding matrix indicator (PMI) information. To improve the accuracy with which the channel state is fed back in the precoding form, the precoding is formed by a linear combination of multiple vectors. The precoding information is fed back in a manner of feeding back the vector forming the precoding or the coefficient of the vector. The coefficient of the vector includes an amplitude of the coefficient and a phase of the coefficient.

In the related art, the vectors forming the precoding are first determined, and then the amplitudes of corresponding vectors and the phases of corresponding vectors are fed back separately. Channel states are usually reported in the same manner on subbands. There is no difference in reporting manners between the subbands, resulting in too much repeated information reported on the subbands and a large amount of redundant information, which not only occupies reporting resources and reduces the utilization rate of resources but also increases the energy consumption of reporting terminals and reduces the accuracy of channel state reporting.

SUMMARY

The present disclosure provides a method and device for reporting channel state information, a method and device for processing channel state information, and a storage medium so as to solve the following problem in the related art: there is no difference in reporting manners between the subbands, resulting in too much repeated information reported on the subbands and a large amount of redundant information, which not only occupies reporting resources and reduces the utilization rate of resources but also increases the energy consumption of reporting terminals and reduces the accuracy of channel state reporting.

A method for reporting channel state information is provided in an embodiment of the present disclosure. The method includes: dividing M subbands to be reported into two sets, where a first set includes N of the M subbands, M is a positive integer greater than 1, N is a positive integer greater than or equal to 1, and M−N≥1; determining a relative value between CSI of each subband in a second set and CSI of a reference subband corresponding to the each subband in the second set; and reporting CSI of each subband in the first set and the relative value of the each subband in the second set to a base station.

A method for processing channel state information is further provided in an embodiment of the present disclosure. The method includes: receiving CSI of each subband in a first set and a relative value of each subband in a second set which are sent by a terminal, where the relative value is a relative value between CSI of the each subband in the second set and CSI of a reference subband corresponding to the each subband in the second set, a sum of a number of subbands in the first set and a number of subbands in the second set is M, and M is an integer greater than 1; and determining the CSI of the each subband in the second set according to the relative value of the each subband in the second set and the CSI of the reference subband corresponding to the each subband in the second set.

A device for reporting channel state information is provided in an embodiment of the present disclosure. The device includes a processor, a memory and a communication bus.

The communication bus is configured to implement connection and communication between the processor and the memory.

The processor is configured to execute a program for reporting channel state information stored in the memory to implement the method described in the preceding embodiment.

A device for processing channel state information is further provided in an embodiment of the present disclosure. The device includes a processor, a memory and a communication bus.

The communication bus is configured to implement connection and communication between the processor and the memory.

The processor is configured to execute a program for processing channel state information stored in the memory to implement the method described in the preceding embodiment.

A storage medium storing a computer program is further provided in an embodiment of the present disclosure. The computer program, when executed by a processor, implements the method described in the preceding embodiment.

A storage medium storing a computer program is further provided in an embodiment of the present disclosure. The computer program, when executed by a processor, implements the method described in the preceding embodiment.

According to the present disclosure, the subbands to be reported are divided into two sets, the channel state information of the subbands in the first set is normally sent, and the relative value between the channel state information of each subband in the second set and the channel state information of the reference subband corresponding to the each subband in the second set is determined and sent, so that the part of channel state information which is the same as a part of channel state information on the reference subband is not required to be reported on the subband in the second set and merely the relative value with respect to the channel state information of the reference subband is reported. Therefore, reporting of redundant channel state information is reduced, overhead of reporting resources is saved, the utilization efficiency of reporting resources is improved, and the accuracy of channel state reporting is further improved.

DETAILED DESCRIPTION

The present disclosure provides a method and device for reporting channel state information, a method and device for processing channel state information, and a storage medium to solve the following problem in the related art: there is no difference in reporting manners between the subbands, resulting in too much repeated information reported on the subbands and a large amount of redundant information, which not only occupies reporting resources and reduces the utilization rate of resources but also increases the energy consumption of reporting terminals and reduces the accuracy of channel state reporting. The present disclosure is further described below in detail in conjunction with drawings and embodiments. It is to be understood that the embodiments described herein are merely intended to explain the present disclosure, but is not intended to limit the present disclosure.

Figure 1:
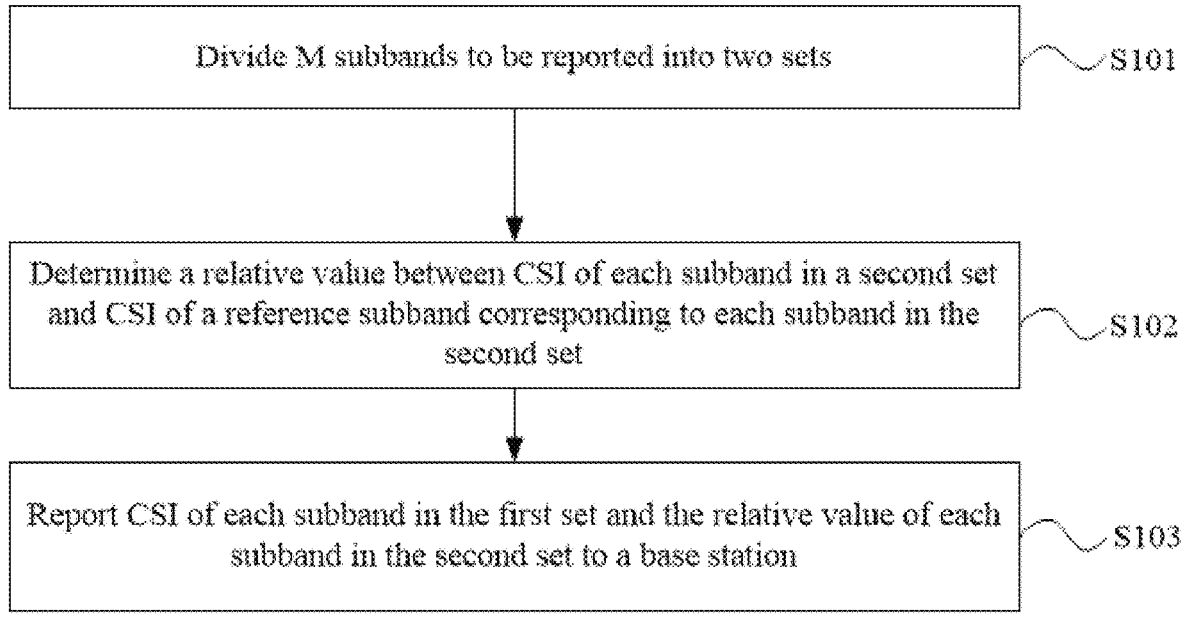
FIG. 1 is a flowchart of a method for reporting channel state information according to a first embodiment of the present disclosure.

A method for reporting channel state information is provided in a first embodiment of the present disclosure and is mainly applied to a reporting side device for reporting channel state information. The flowchart is as shown in FIG. 1, and the method mainly includes steps S101 to S103.

In S101, M subbands to be reported are divided into two sets.

In S102, a relative value between CSI of each subband in a second set and CSI of a reference subband corresponding to each subband in the second set is determined.

In S103, CSI of each subband in the first set and the relative value of each subband in the second set are reported to a base station.

In this embodiment, the subband is a unit in a frequency domain, and a reporting side of channel state information, such as a terminal, reports channel state information of a certain bandwidth by reporting channel state information on a plurality of subbands forming the bandwidth. In the related art, channel state information may be represented by various parameters, such as precoding of an antenna on a base station side (i.e., a transmitting side), or an antenna channel coefficient matrix from a base station to a terminal, or a correlation matrix of an antenna channel coefficient matrix; channel state information may also be a coefficient of a vector participating in forming precoding, an amplitude of the coefficient of the vector participating in forming precoding, or a phase of the coefficient of the vector participating in forming precoding; or channel state information may also be a coefficient of a vector forming an antenna channel coefficient matrix, or an amplitude of the coefficient of the vector forming an antenna channel coefficient matrix, or a phase of the coefficient of the vector forming an antenna channel coefficient matrix. Alternatively, channel state information may also be reference signal receiving power (RSRP) of a reference signal transmitted by the transmitting side and received by the terminal, reference signal receiving quality (RSRQ) of a reference signal transmitted by the transmitting side and received by the terminal, or RSRP of a synchronization signal, or RSRQ of a synchronization signal. Alternatively, channel state information may also be a channel quality indicator (CQI) of a data transmission channel from the base station to the terminal.

It is to be understood that the method provided in this embodiment is mainly applied to the case where the channel state information includes at least one of the following parameters: the coefficient of the vector participating in forming precoding, the amplitude of the coefficient of the vector participating in forming precoding, or the phases of the coefficient of the vector participating in forming precoding. For example, for a coefficient of a vector of a subband in the second set, merely the relative value of the coefficient of the vector of the subband in the second set is reported during reporting, and after receiving the relative value of the coefficient of the vector of the subband in the second set reported by the reporting side, the transmitting side determines the coefficient of the vector of the subband in the second set according to the relative value and the coefficient of the vector of the reference subband of the subband in the second set. For the phase or amplitude of the coefficient of the vector of the subband in the second set, the reporting and processing procedures are similar to the reporting and processing procedures of the coefficient of the vector of the subband in the second set, and details are not described herein.

Specifically, the reference subband corresponding to each subband in the second set includes at least one subband in the first set. For example, merely one subband is provided in the first set, and then the subband in the first set may be the reference subband for each subband in the second set. If a plurality of subbands are provided in the first set, the subbands in the second set may be divided into groups corresponding to all subbands in the first set, each subband in the first set being the reference subband of the corresponding subband group in the second set. Alternatively, the subbands in the first set are divided into a plurality of subband groups, the subbands in the second set are divided into groups corresponding to the subband groups in the first set, and then each subband group in the first set is the reference subband of the corresponding subband group in the second set. Alternatively, a plurality of subbands are provided in the first set and are the reference subbands of part of subbands in the second set. In practical use, the reference subband for each subband in the second set may be uniformly configured by the transmitting side, or manually configured by debugging and operation and maintenance personnel, or configured by the reporting side according to the actual situation. When the reference subband is configured by the reporting side, the configuration situation of the reference subband corresponding to each subband in the second set should be reported to the transmitting side together, so that the transmitting side can obtain the channel state information of the corresponding subband in the second set according to the configuration situation.

Further, the reference subband corresponding to each subband in the second set may also be at least one subband in the first set or a subband adjacent to the each subband in the second set, where the reference subband of at least one subband in the second set should be at least one subband in the first set. For the adjacent subband in the second set, an adjacent subband of the subband to which current channel state information belongs may specifically be on the lower frequency side or the higher frequency side of the current subband. For example, subband 0 is included in the first set and subbands 1 to 5 are included in the second set, and then the adjacent subbands of subband 2 are subband 1 and subband 3. When the reference subband of subband 2 is determined, subband 1 may be used as the reference subband of subband 2, subband 3 may be used as the reference subband of subband 2, or subband 1 and subband 3 may be simultaneously used as the reference subband of subband 2. The adjacent subbands of subband 1 are subband 0 and subband 2, and the reference subband of subband 1 may be subband 0 or subband 2, that is, the reference subband of subband 1 may be a subband in the first set or a subband in the second set.

It is to be noted that each subband in the second set corresponds to a reference subband. The reference subband belongs to either the first set or the second set. If the reference subband belongs to the second set, the reference subband should also have its own reference subband which belongs to either the first set or the second set. Then, according to the above link relationship, eventually the reference subband of one subband in the second set belongs to the first set, and the case where the reference subbands of all subbands in the second set are subbands in the second set does not occur, so as to ensure the calculability and accuracy of channel state information of subbands in the second set.

In this embodiment, the reporting side receives the reference signal transmitted by the transmitting side, reports the channel state information of corresponding bandwidth according to the reference signal, and divides M subbands forming the bandwidth into two different subband sets before the reporting. M is a positive integer greater than 1. The first set includes N subbands, and N is a positive integer greater than or equal to 1. The second set includes (M−N) subbands correspondingly, and M−N≥1. It is to be understood that the specific numerical value of N may be set by the reporting side according to the actual situation, or actively set by the transmitting side according to the actual situation, or manually set by the debugging and operation and maintenance personnel.

Specifically, when the M subbands are divided into two sets, the division may be performed according to the CQI of channel quality as a standard. At the time of division, firstly, the channel quality of each of the M subbands is calculated, then the first N subbands with the highest channel quality are selected as subbands in the first set, and the remaining (M−N) subbands are selected as subbands in the second set. Since the reference subband of certainly one of the subbands in the second set is in the first set, the channel quality of the subbands in the first set being ensured to be high is beneficial to improving the reporting accuracy of channel state information.

Alternatively, when the subband in the first set is determined, the first set is ensured to at least have one of the characteristics described below.

(1) The first set at least includes the subband with the lowest frequency among the M subbands.

(2) The first set at least includes the subband with the highest frequency among the M subbands.

(3) The first set at least includes a subband with a middle frequency among the M subbands. The difference between the sequence number of the subband with the middle frequency and the sequence number of the subband with the lowest frequency among the M subbands is D1, the difference between the sequence number of the subband with the middle frequency and the sequence number of the subband with the highest frequency among the M subbands is D2, and the absolute value of the difference between D1 and D2 does not exceed 1.

It is to be noted that the reference subband of certainly one subband in the second set belongs to the first set. Then, if the first set includes one of the subbands to be reported at two ends of the frequency domain, for example, includes the subband with the lowest frequency among the subbands to be reported or the subband with the highest frequency among the subbands to be reported, the first set can provide the initial reference subband for a subband in the second set to form a simple link between reference subbands, reduce the complexity of the link, and reduce the complexity of the terminal reporting channel state information. For example, in the case where M equals 6 and N equals 1, the subbands to be reported are {0, 1, 2, 3, 4, 5}, subband 0 has the lowest frequency, the first set includes subband 0, and the second set includes subbands 1 to 5. Then, the reference subband link relationship of each subband in the second set may be as follows: subband 0 is the reference subband of subband 1, subband 1 is the reference subband of subband 2, subband 2 is the reference subband of subband 3, subband 3 is the reference subband of subband 4, and subband 4 is the reference subband of subband 5. Alternatively, subband 5 has the highest frequency and is classified into the first set, and the remaining subbands are the second set. Then, the reference subband link relationship of each subband in the second set may be as follows: subband 5 is the reference subband of subband 4, subband 4 is the reference subband of subband 3, subband 3 is the reference subband of subband 2, subband 2 is the reference subband of subband 1, and subband 1 is the reference subband of subband 0.

The link relationship between subbands in the second set is simple, and the correlation of channel state information on adjacent subbands can be continuously utilized to simplify the complexity of channel state information reporting. For example, the channel state information has a trend of continuous change from low to high in frequency, or the channel state information has a trend of continuous change from high to low in frequency. Such trend leads to simplification in reporting by the reporting side, such as all positive phase changes or all negative phase changes, and the phase change direction is merely required to be reported once for the plurality of subbands or all the subbands without being reported for each subband.

In addition, the first set includes the subband with the middle frequency among the M sub-bands. The most initial reference subband for a subband in the second set can be provided to reduce the maximum length of the reference subband link and further reduce the accumulated error generated from the end of the link to the beginning of the link.

When the relative value between the CSI of each subband in the second set and the CSI of the reference subband corresponding to each subband in the second set is determined, the CSI of each subband in the second set is first calculated, the CSI value of the reference subband corresponding to each subband is determined according to the relationship between each subband and the corresponding reference subband, and then the relative value of each subband is determined according to the CSI value of each subband and the CSI value of the reference subband corresponding to each subband. On the contrary, when the base station receives the relative value between a subband in the second set subband and the reference subband reported by the terminal, the CSI value of the subband in the second set can be calculated according to the CSI of the reference subband, the relative value, and a preset function. The preset function may be a calculation function pre-agreed between the base station and the terminal. The specific execution process of the function is determined according to the actual situation.

For example, the first set includes subband 0, subband 2 and subband 4, and the second set includes subband 1, subband 3 and subband 5; the reference subband of subband 1 is subband 0, the reference subband of subband 3 is subband 2, and the reference subband of subband 5 is subband 4. The terminal calculates the channel state information of subbands 0 to 5 as C0, C1, C2, C3, C4 and C5, respectively. In this case, the relative value I1 between subband 1 and subband 0 is (C1-C0), the relative value I3 between subband 3 and subband 2 is (C3-C2), and the relative value I5 between subband 5 and subband 4 is (C5-C4). When reporting, the terminal merely needs to report the channel state information C0, C2 and C4 respectively corresponding to subband 0, subband 2 and subband 4 in the first set and report the relative values I1, I3 and I5 of the subbands in the second set.

For example, the first set includes subband 0, the second set includes subbands 1 to 3, the reference subband of subband 1 is 0, the reference subband of subband 2 is 1, and the reference subband of subband 3 is 2. The terminal calculates the channel state information of subbands 0 to 3 as C0, C1, C2, and C3, respectively. In this case, the relative value I1 between subband 1 and subband 0 is (C1-C0), the relative value I2 between subband 2 and subband 1 is (C2-C1), and the relative value I3 between subband 3 and subband 2 is (C3-C2). When reporting, the terminal merely needs to report the channel state information C0 of subband 0 in the first set and report the relative values I1, I2 and I3 of the subbands in the second set.

It is to be understood that each subband in the second set may correspond to one reference subband or a plurality of reference subbands. When a subband in the second set corresponds to a plurality of reference subbands, the relative value of the subband is jointly determined according to the CSI of the plurality of reference subbands and the CSI value of the subband. On the contrary, the base station side calculates and determines the CSI value of a subband in the second set according to the relative value of the subband and the CSI values of the plurality of reference subbands corresponding to the subband.

The relative value of a subband in the second set is the product of the numerical value of the relative value and a product factor. The value of the relative value of each subband in the second set may be different and is reported separately, but a same product factor may be used for the second set in one reporting and merely needs to be reported once, which can further reduce the content to be reported and improve the utilization efficiency of resources. In addition, the base station or the terminal may change the dynamic range of the relative values of the subbands in the second set simply by changing the magnitude of the product factor.

Further, the product factor may present in the form of a maximum value, a unit, or a scaling factor. When the product factor presents in the form of a maximum value or a unit, the value of the product factor may be a numerical value or a physical quantity with size and direction. For example, when the CSI reported by the terminal is the phases of the coefficient of the vector participating in forming the precoding, the product factor may be expressed as radian or angle, the plus or minus of the numerical value may indicate the direction, and the magnitude of the numerical value indicates the amplitude of rotation, for example, a positive number indicates clockwise rotation and a negative number indicates counterclockwise rotation. When the product factor presents in the form of a scaling factor, the product factor can only be a numerical value to merely represent the specific scaling size.

In this embodiment, the product factor described above may be determined according to the CSI value of each subband in the first set. For example, the quantization granularity of CSI of a subband in the first set is used as the maximum value of the relative value of a subband in the second set to be reported and may also be used as the unit of the numerical value of the relative value; or, a function of the quantization granularity of the CSI of a subband in the first set is used as the maximum value or unit of the relative value of a subband in the second set to be reported; or, a function of the number of bits used by a subband in the first set and/or a function of the number of quantization values is used as the maximum value or unit of the relative value of a subband in the second set to be reported; or, the variation of CSI with the subband sequence number or subband difference is calculated according to the CSI of a subband in the first set and a subband sequence number, and the variation or a function of the variation is used as the maximum value or unit or scaling factor of the relative value of a subband in the second set.

Optionally, when the terminal reports the CSI of each subband in the first set and the relative value of each subband in the second set to the base station, the number of bits used for reporting the CSI of each subband in the first set is greater than the number of bits used for reporting the relative value of each subband in the second set. Each subband in the second set corresponds to a reference subband. The reference subband belongs to either the first set or the second set. If the reference subband belongs to the second set, the reference subband should also have its own reference subband which belongs to either the first set or the second set. Then, according to the above link relationship, eventually the reference subband of one subband in the second set belongs to the first set, and the case where reference subbands of all subbands in the second set are subbands in the second set does not occur. Thus, the number of bits used for reporting the CSI of one subband in the first set is increased so that the reporting accuracy corresponding to the first set can be improved, which is equivalent to that the accuracy of the reference subband corresponding to the subband in the second set is improved, further improving the reporting accuracy of the channel state information, simultaneously reducing the number of bits used for reporting the second set, and reducing the resource overhead of the reporting.

Further, in the case where the number of bits used for reporting the relative value of each subband in the second set is 1, whether the CSI of each subband in the second set changes with respect to the CSI of the reference subband of the subband may be determined by the state of the bit. Specifically, a zero state of the bit indicates that the CSI of each subband in the second set is unchanged with respect to the CSI of the reference subband of the subband, and when receiving the bit in the zero state, the corresponding base station side can directly determine that the CSI of the subband in the second set is the same as the CSI of the reference subband corresponding to the subband. A non-zero state (i.e., 1 state) of the bit indicates that the CSI of each subband in the second set changes in a preset direction and by a preset magnitude with respect to the CSI of the reference subband corresponding to each subband in the second set. The preset direction and magnitude may be values prenegotiated between the base station and the terminal. When the base station receives the bit in the 1 state, the CSI may be directly changed in the preset direction and by the preset magnitude on the basis of the CSI of the reference subband corresponding to the subband in the second set.

According to this embodiment, the subbands to be reported are divided into two sets, the channel state information of the subbands in the first set is normally sent, and the relative value between the channel state information of each subband in the second set and the channel state information of the reference subband corresponding to the each subband in the second set is determined and sent, so that the part of channel state information which is the same as a part of channel state information on the reference subband is not required to be reported on the subband in the second set and merely the relative value with respect to the channel state information of the reference subband is reported. Therefore, reporting of redundant channel state information is reduced, overhead of reporting resources is saved, the utilization efficiency of reporting resources is improved, and the accuracy of channel state reporting is further improved.

Figure 2:
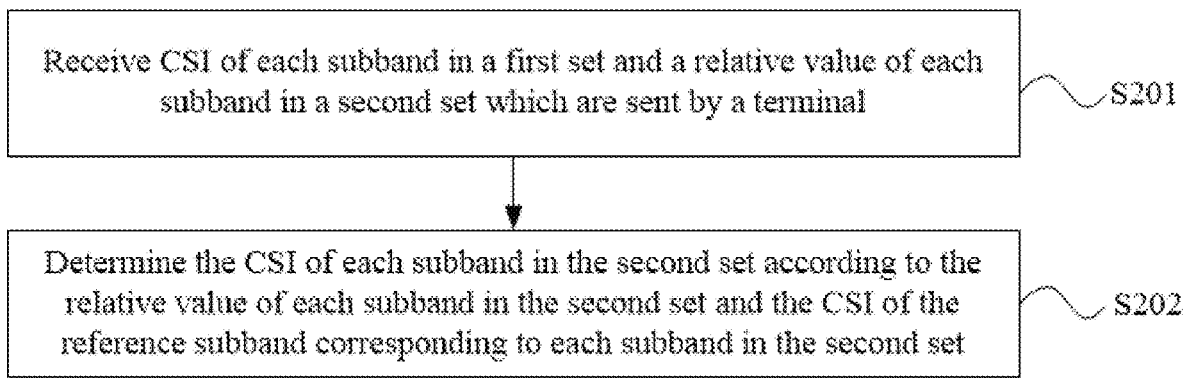
FIG. 2 is a flowchart of a method for processing channel state information according to a second embodiment of the present disclosure.
Figure 3:
FIG. 3 is a schematic structure diagram of a device for reporting or processing channel state information according to a third embodiment and a fourth embodiment of the present disclosure.

A method for processing channel state information is provided in a second embodiment of the present disclosure and is mainly applied to a transmitting side device for receiving channel state information. The flowchart is as shown in FIG. 2, and the method mainly includes steps S201 and S202.

In S201, CSI of each subband in a first set and a relative value of each subband in a second set which are sent by a terminal are received.

In S202, the CSI of each subband in the second set is determined according to the relative value of each subband in the second set and the CSI of the reference subband corresponding to each subband in the second set.

The method provided in this embodiment is mainly applied to the case where the channel state information includes at least one of the following parameters: the coefficient of vector participating in forming precoding, the amplitude of coefficient of vector participating in forming precoding, or the phase of coefficient of vector participating in forming precoding. For example, for the coefficient of a vector of a subband in the second set, the terminal merely reports the relative value of the coefficient of the vector of the subband in the second set, and after receiving the relative value of the coefficient of the vector of the subband in the second set reported by the terminal, a base station determines the coefficient of the vector of the subband in the second set according to the relative value and the coefficient of the vector of the reference subband of the subband in the second set.

Specifically, the sum of the number of subbands in the first set and the number of subbands in the second set is M. M is a positive integer greater than 1. The relative value reported by the terminal is a relative value between CSI of each subband in the second set and CSI of a reference subband corresponding to each subband in the second set. After receiving the relative value of a subband in the second set, the base station calculates the CSI of the subband according to the relative value and the CSI value of the reference subband of the subband.

The reference subband of a subband in the second set at least includes at least one subband in the first set. In this case, determining the CSI of each subband in the second set by the base station according to the relative value of each subband in the second set and the CSI of the reference subband corresponding to each subband in the second set may specifically be determining the CSI of each subband in the second set by substituting the relative value of each subband in the second set and CSI of at least one of the subbands described below into a first preset function, that is, by substituting the CSI value of a subband in the first set into the first preset function.

The subband with the lowest frequency among the M subbands is at least included.

The subband with the highest frequency among the M subbands is at least included.

A subband with a middle frequency among the M subbands is at least included. The difference between the sequence number of the subband with the middle frequency and the sequence number of the subband with the lowest frequency among the M subbands is D1, the difference between the sequence number of the subband with the middle frequency and the sequence number of the subband with the highest frequency among the M subbands is D2, and the absolute value of the difference between D1 and D2 does not exceed 1.

Further, the specific content of the first preset function may be pre-agreed by the base station and the terminal. After receiving the relative value of a subband in the second set, the base station combines the CSI value of the reference subband corresponding to the subband in the second set to calculate the CSI value of the subband in the second set according to the content of the first preset function. For example, subband i is a subband in the second set, and the relative value of the channel state information of subband i is $I_i$; subband 0 is the subband with the lowest frequency among all subbands to be reported, and the channel state information of subband 0 is C0; subband 1 is the subband with the highest frequency among all subbands to be reported, and the channel state information of subband 1 is C1; subband 2 is a subband with a middle frequency among all subbands to be reported, and the channel state information of subband 2 is C2; the channel state information of subband i is recorded as $C_i$, and then $C_i$ is calculated from a function composed of $I_i$ and one of {C0, C1, C2}, i.e., the first preset function. For example, $C_i = I_i + C2$, or $C_i = I_i * C1 * D$, where D is a preset reference number or physical quantity. It is to be understood that the first preset function is not limited to the addition or multiplication described in this embodiment and may also be a combination of any other calculation methods. Moreover, after the first preset function is agreed, the terminal should calculate the relative value of a subband in the second set according to the reverse calculation method of the first preset function.

In addition, the reference subbands of subbands in the second set may also include at least one subband in the first set or an adjacent subband of each subband. The reference subband of at least one subband in the second set is at least one subband in the first set. In this case, the relative value of each subband in the second set and the CSI of the adjacent subband of each subband are substituted into a second preset function to determine the CSI of each subband in the second set. For example, subband 1 is one of the subbands in the second set, the relative value of the channel state information of subband 1 is I1, subband 2 is an adjacent subband of subband 1, the channel state information of subband 2 is C2, and subband 2 is the reference subband of subband 1. In this case, the channel state information of subband 1 is a combination of I1 and C2, or a function of I1 and C2, that is, the second preset function. For example, C1=I1+C2 or C1=I1*C2. It is to be understood that the second preset function is not limited to the addition or multiplication described in this embodiment and may also be a combination of any other calculation methods. Moreover, after the second preset function is agreed, the terminal should calculate the relative value of a subband in the second set according to the reverse calculation method of the second preset function. The first preset function and the second preset function may be the same or different. In the process of reporting at one time, the first preset function and the second preset function may be used simultaneously, or merely one of the two functions is used. The usage situation depends on the configuration of the reference subband.

According to this embodiment, the channel state information of a subband in the second set can be correspondingly obtained according to the relative value of the channel state information of the subband in the second set and the channel state information of the reference subband of the subband in the second set, so that the terminal does not need to report the part of channel state information which is the same as a part of channel state information on the reference subband and merely needs to report the relative value with respect to the channel state information of the reference subband. Therefore, reporting of redundant channel state information is reduced, overhead of reporting resources is saved, the utilization efficiency of reporting resources is improved, and the accuracy of channel state reporting is further improved.

A device for reporting channel state information is provided in a third embodiment of the present disclosure. The device includes a processor 301, a memory 302 and a communication bus.

The communication bus is configured to implement connection and communication between the processor 301 and the memory 302.

The processor 301 is configured to execute a program for reporting channel state information stored in the memory 302 to implement the steps described below.

M subbands to be reported are divided into two sets, where a first set includes N of the M subbands, M is a positive integer greater than 1, N is a positive integer greater than or equal to 1, and M−N≥1.

The relative value between CSI of each subband in a second set and CSI of a reference subband corresponding to each subband in the second set is determined.

CSI of each subband in the first set and the relative value of each subband in the second set are reported to a base station.

A device for processing channel state information is provided in a fourth embodiment of the present disclosure. The device includes a processor 301, a memory 302 and a communication bus.

The communication bus is configured to implement connection and communication between the processor 301 and the memory 302.

The processor 301 is configured to execute a program for processing channel state information stored in the memory 302 to implement the steps described below.

CSI of each subband in a first set and a relative value of each subband in a second set which are sent by a terminal are received, where the relative value is a relative value between CSI of each subband in the second set and CSI of a reference subband corresponding to each subband in the second set, a sum of the number of subbands in the first set and the number of subbands in the second set is M, and M is an integer greater than 1.

The CSI of each subband in the second set is determined according to the relative value of each subband in the second set and the CSI of the reference subband corresponding to each subband in the second set.

A storage medium storing a computer program is provided in a fifth embodiment of the present disclosure. The computer program, when executed by a processor, implements the steps described below.

In S11, M subbands to be reported are divided into two sets.

In S12, a relative value between CSI of each subband in a second set and CSI of a reference subband corresponding to each subband in the second set is determined.

In S13, CSI of each subband in the first set and the relative value of each subband in the second set are reported to a base station.

The storage medium in this embodiment may be installed on a device having a channel state information reporting function. The specific steps of the method for reporting channel state information have been described in detail in the first embodiment and will not be described here in this embodiment.

A storage medium storing a computer program is provided in a sixth embodiment of the present disclosure. The computer program, when executed by a processor, implements the steps described below.

In S21, CSI of each subband in a first set and a relative value of each subband in a second set which are sent by a terminal are received.

In S22, the CSI of each subband in the second set is determined according to the relative value of each subband in the second set and the CSI of the reference subband corresponding to each subband in the second set.

The storage medium in this embodiment may be installed on a device having a channel state information processing function. The specific steps of the method for processing channel state information have been described in detail in the second embodiment and will not be described here in this embodiment.

Optionally, in this embodiment, the preceding storage medium may include, but is not limited to, a universal serial bus flash disk, a read-only memory (ROM), a random access memory (RAM), a mobile hard disk, a magnetic disk, an optical disk or another medium capable of storing program codes. Optionally, in this embodiment, the processor performs the steps of the method in the preceding embodiment according to the program codes stored in the storage medium. Optionally, for specific examples in this embodiment, reference may be made to the examples described in the preceding embodiments and optional embodiments. Details are not described herein again. Apparently, it is to be understood by those skilled in the art that the modules or steps of the present disclosure may be implemented by a general-purpose computing apparatus and may be concentrated on a single computing apparatus or distributed in a network formed by multiple computing apparatuses. Optionally, these modules or steps may be implemented by program codes executable by the computing apparatus. Thus, these modules or steps may be stored in a storage apparatus and executed by the computing apparatus. Moreover, in some cases, the illustrated or described steps may be executed in a sequence different from the sequence described herein. Alternatively, each of these modules or steps may be implemented by being made into an integrated circuit module or multiple modules or steps among these modules or steps may be implemented by being made into a single integrated circuit module. In this way, the present disclosure is not limited to any specific combination of hardware and software.

What is claimed is:

1. A method for reporting channel state information (CSI), comprising:
dividing M subbands to be reported into two sets, wherein a first set comprises N of the M subbands, M is a positive integer greater than 1, N is a positive integer greater than or equal to 1, and M−N≥1;
determining a relative value between CSI of each subband in a second set and CSI of a reference subband corresponding to the each subband in the second set; and
reporting CSI of each subband in the first set and the relative value of the each subband in the second set to a base station;
wherein reporting the CSI of the each subband in the first set and the relative value of the each subband in the second set to the base station comprises:
a number of bits used for reporting the CSI of the each subband in the first set being greater than a number of bits used for reporting the relative value of the each subband in the second set;
and
in a case where the number of bits used for reporting the relative value of the each subband in the second set is 1, a zero state of the bit indicates that the CSI of the each subband in the second set is unchanged with respect to the CSI of the reference subband of the each subband in the second set, and a non-zero state of the bit indicates that the CSI of the each subband in the second set changes in a preset direction and by a preset magnitude with respect to the CSI of the reference subband of the each subband in the second set.

2. The method of claim 1, wherein the CSI comprises at least one of: a coefficient of a vector participating in forming precoding, a phase of the coefficient, or an amplitude of the coefficient.

3. The method of claim 1, wherein the reference subband corresponding to the each subband in the second set comprises at least one subband in the first set.

4. The method of claim 1, wherein the reference subband corresponding to the each subband in the second set comprises at least one subband in the first set or a subband adjacent to the each subband in the second set, wherein a reference subband of at least one subband in the second set is at least one subband in the first set.

5. The method of claim 1, wherein the first set comprises at least one of:
a subband with a lowest frequency among the M subbands;
a subband with a highest frequency among the M subbands; or
a subband with a middle frequency among the M subbands, wherein a difference between a sequence number of the subband with the middle frequency and a sequence number of the subband with a lowest frequency among the M subbands is D1, a difference between the sequence number of the subband with the middle frequency and a sequence number of the subband with a highest frequency among the M subbands is D2, and an absolute value of a difference between D1 and D2 does not exceed 1.

6. The method of claim 1, wherein the relative value is a product of a numerical value of the relative value and a product factor of the relative value, wherein the product factor is a physical quantity having a direction.

7. The method of claim 6, further comprising: determining the product factor according to the CSI of the each subband in the first set.

8. A method for processing channel state information (CSI), comprising:
receiving CSI of each subband in a first set and a relative value of each subband in a second set which are reported by a terminal, wherein the relative value is a relative value between CSI of the each subband in the second set and CSI of a reference subband corresponding to the each subband in the second set, a sum of a number of subbands in the first set and a number of subbands in the second set is M, and M is an integer greater than 1; and
determining CSI of the each subband in the second set according to the relative value of the each subband in the second set and the CSI of the reference subband corresponding to the each subband in the second set;
wherein a number of bits used for reporting the CSI of the each subband in the first set being greater than a number of bits used for reporting the relative value of the each subband in the second set;
and
in a case where the number of bits used for reporting the relative value of the each subband in the second set is 1, a zero state of the bit indicates that the CSI of the each subband in the second set is unchanged with respect to the CSI of the reference subband of the each subband in the second set, and a non-zero state of the bit indicates that the CSI of the each subband in the second set changes in a preset direction and by a preset magnitude with respect to the CSI of the reference subband of the each subband in the second set.

9. The method of claim 8, wherein the CSI comprises at least one of: a coefficient of a vector participating in forming precoding, a phase of the coefficient, or an amplitudes of the coefficient.

10. The method of claim 8, wherein the reference subband corresponding to the each subband in the second set comprises at least one subband in the first set.

11. The method of claim 8, wherein the reference subband corresponding to the each subband in the second set comprises at least one subband in the first set or a subband adjacent to the each subband in the second set, wherein a reference subband of at least one subband in the second set is at least one subband in the first set.

12. The method of claim 10, wherein determining the CSI of the each subband in the second set according to the relative value of the each subband in the second set and the CSI of the reference subband corresponding to the each subband in the second set comprises:
determining the CSI of the each subband in the second set by substituting the relative value of the each subband in the second set and CSI of at least one of following subbands into a first preset function:
a subband with a lowest frequency among M subbands;
a subband with a highest frequency among M subbands; or
a subband with a middle frequency among M subbands, wherein a difference between a sequence number of the subband with the middle frequency and a sequence number of the subband with a lowest frequency among the M subbands is D1, a difference between the sequence number of the subband with the middle frequency and a sequence number of the subband with a highest frequency among the M subbands is D2, and an absolute value of a difference between D1 and D2 does not exceed 1.

13. The method of claim 11, wherein determining the CSI of the each subband in the second set according to the relative value of the each subband in the second set and the CSI of the reference subband corresponding to the each subband in the second set comprises:

determining the CSI of the each subband in the second set by substituting the relative value of the each subband in the second set and CSI of the subband adjacent to the each subband in the second set into a second preset function.

14. A device for reporting channel state information, comprising: a processor, a memory and a communication bus;

wherein the communication bus is configured to implement connection and communication between the processor and the memory; and the processor is configured to execute a program for reporting channel state information stored in the memory to implement the method of claim 1.

15. A device for processing channel state information, comprising: a processor, a memory and a communication bus;

wherein the communication bus is configured to implement connection and communication between the processor and the memory; and the processor is configured to execute a program for processing channel state information stored in the memory to implement the method of claim 8.

16. A non-transitory storage medium storing a computer program, wherein the computer program, when executed by a processor, implements the method of claim 1.

17. A non-transitory storage medium storing a computer program, wherein the computer program, when executed by a processor, implements the method of claim 8.

* * * * *